United States Patent [19]

Ikuta

[11] 3,804,193
[45] Apr. 16, 1974

[54] AUTOMATIC CONSTANT SPEED CONTROL SYSTEM FOR VEHICLES

[75] Inventor: Hiroshi Ikuta, Nagoya, Japan
[73] Assignee: Nippondenso Co., Ltd., Kariya-shi, Aichi-ken, Japan
[22] Filed: Sept. 26, 1972
[21] Appl. No.: 292,462

[30] Foreign Application Priority Data
Sept. 30, 1971  Japan.............................. 46-76897

[52] U.S. Cl.................. 180/105 E, 123/102, 317/5
[51] Int. Cl............................................. B60k 27/00
[58] Field of Search........... 180/105 E; 123/97, 102; 317/5

[56] References Cited
UNITED STATES PATENTS
3,599,154  8/1971  Carol et al. ................... 123/97 R X
3,455,411  7/1969  Carp et al. ..................... 123/102 X
3,485,316  12/1969  Slavin et al. ................... 123/102 X
3,476,205  11/1969  Kato .............................. 123/102 X Primary Examiner—Robert B. Reeves
Assistant Examiner—Joseph J. Rolla
Attorney, Agent, or Firm—Cushman, Darby & Cushman

[57] ABSTRACT

An automatic constant speed control system for vehicles, in which when either a setting switch or a vehicle speed change switch is operated to set the desired speed, pulse signals corresponding in number to the throttle position derived from said desired vehicle speed are generated and the sum of said pulse signals and those pulse signals which are proportional in number to the vehicle speed are stored in a memory, whereby when the desired speed is reached, the vehicle can accurately come to a constant speed driving condition at the vehicle speed existing at that moment without a deviation of several Km/h as was the case with conventional systems.

1 Claim, 4 Drawing Figures

AUTOMATIC CONSTANT SPEED CONTROL SYSTEM FOR VEHICLES

BACKGROUND OF THE INVENTION

1. FIELD OF THE INVENTION

The present invention relates to an automatic constant speed control system for vehicles, particularly automotive vehicles.

2. DESCRIPTION OF THE PRIOR ART

A general form of automatic constant speed control systems for vehicles as known in the art is shown in FIG. 1, wherein the position of a throttle valve 2 in an internal combustion engine 1 mounted in a vehicle is detected electrically or mechanically by a throttle position detector 3, while the actual vehicle speed is electrically or mechanically detected by a vehicle speed detector 4. When the vehicle is running at a suitable speed and, to effect the constant speed control of the vehicle at this vehicle speed, a setting switch 5 is closed and then released thereby actuating a memory circuit 6, the memory circuit 6 electrically or mechanically stores a signal which is the sum of a vehicle speed signal from the vehicle speed detector 4 and a throttle position signal from the throttle position detector 3 which are generated at the time of the setting of the vehicle speed. The memory circuit 6 may consist of an electrical memory means employing for example a capacitor or a mechanical memory means employing for example a combination of a potentiometer and a servomotor. In this manner, the memory circuit 6 continues to store the vehicle speed and the position of the throttle valve detected at the time of the setting of the vehicle speed up to the moment that the setting switch 5 is closed again. Then, an arithmetic circuit 7 receives a throttle position signal from the throttle position detector 3, a vehicle speed signal from the vehicle speed detector 4 and a memory signal from the memory circuit 6 and detects, with respect to the memory signal, changes in the actual vehicle speed and the position of the throttle valve due to changes in the road conditions and the like. In accordance with the results of this detection, if it is necessary to increase the vehicle speed, a signal for increasing the opening of the throttle valve 2 is generated at an output terminal 71 of the arithmetic circuit 7, whereas if it is necessary to decrease the vehicle speed, a signal for decreasing the opening of the throttle valve 2 is generated at another output terminal 72. The signal thus generated at the output terminal 71 or 72 is then amplified in an amplifier 8 and delivered to its output terminal 81 or 82. When a drive unit 9 receives the signal for increasing the vehicle speed generated at the output terminal 81 of the amplifier 8, it electromagnetically increases the opening of the throttle valve 2 through link means, thereby increasing the vehicle speed, whereas when the drive unit 9 receives the signal for decreasing the vehicle signal generated at the output terminal 82 of the amplifier 8, it likewise electromagnetically decreases the opening of the throttle valve 2 through the link means to thereby decrease the vehicle speed. This process of operation is repeated, maintaining the actual vehicle speed at the set speed and thereby maintaining the vehicle speed constant according to the set speed. When the vehicle is travelling under a constant speed driving condition, if the driver desires to set the constant speed control system to a new desired speed higher than the current vehicle set speed and thus temporarily accelerate the vehicle until the vehicle breaks away from the existing constant speed driving condition and attains the new desired speed, an acceleration speed change switch 10 (hereinafter referred to as an acceleration switch) is closed so that the speed-increasing mechanism of the drive unit 9 is independently actuated to forcibly increase the opening of the throttle valve 2 further and thereby rapidly increase the vehicle speed. Then, as the desired speed is reached, the acceleration switch 10 is released with the result that the memory circuit 6 stores the then current desired speed and the position of the throttle valve 2 at that time and thus the vehicle comes to and remains in the constant speed driving condition. On the other hand, with the vehicle travelling under a constant speed driving condition, if it is desired to set the constant speed control system to a new desired speed which is lower than the current vehicle set speed and thus temporarily decelerate the vehicle until the vehicle breaks away from the existing constant speed driving condition and attains the new desired vehicle speed, a deceleration speed change switch 11 (hereinafter referred to as a deceleration switch) is closed, so that the speed-reducing mechanism of the drive unit 9 is independently actuated to forcibly decrease the opening of the throttle valve 2 and thereby rapidly decrease the vehicle speed. When the new desired speed is reached, the deceleration switch 11 is released with the result that the memory circuit 6 stores the then current desired speed and the opening of the throttle valve 2 existing at that time and thus the vehicle comes to and remains under the constant speed driving condition.

A disadvantage of the constant speed control system of the type described above is that when the setting switch 5 is operated, if the position of the throttle valve 2 for the vehicle speed at that time deviates from one proportional to that vehicle speed, the vehicle comes to the constant speed driving condition at a speed which deviates 2 to 4 Km/h from the vehicle speed corresponding to the set speed. On the other hand, if the acceleration switch 10 is closed increasing the vehicle speed for a period of several seconds and it is then released upon reaching the desired speed to thereby bring the vehicle to a constant speed driving condition at the speed existing at that moment, the vehicle comes to the constant speed driving condition at a speed which is about 2 to 4 Km/h higher than that vehicle speed. Furthermore, if the deceleration switch 11 is closed allowing the vehicle speed to decrease for a period of several seconds and it is then released upon reaching the desired speed to thereby bring the vehicle to a constant speed driving condition at that instant, the vehicle comes to the constant speed driving condition at a speed which is lower than the then existing vehicle speed by 2 to 4 Km/h. These phenomena which are contrary to the will of the driver give rise to various problems from the standpoint of reliability, safety and the like. These problems are caused by the fact that the change in the vehicle speed is not exactly proportional to the change in the position of the throttle valve 2 and there is a certain time lag in the operation. Therefore, when any of the setting switch 5, acceleration switch 10 and deceleration switch 11 is to be operated to bring the vehicle to a constant speed driving condition, if, for example, the setting switch 5 is operated while rapidly accelerating the vehicle, the increase in the vehicle speed is delayed in time in spite of the throttle valve 2 already moved to the full throttle position. For this reason, when the desired speed has been reached, the throttle valve 2 has moved to a position beyond that which corresponds to the desired speed. Thus, if the setting switch 5 is released at the instant that the desired speed is reached, although the memory circuit 6 stores the vehicle speed which corresponds to that desired speed, the position of the throttle valve 2 stored in the memory circuit 6 is in fact greater than one which corresponds to the desired speed. This fact gives rise to the above-mentioned problems.

SUMMARY OF THE INVENTION

It is an object of the present invention to provide an automatic constant speed control system for vehicles which solves the foregoing problems and in which when either a setting switch or a speed change switch is operated to set the system to the desired speed, pulse signals which correspond in number to the throttle valve position derived from the desired speed are generated and the sum of said pulse signals and those pulse signals which are proportional in number to the vehicle speed is stored in a memory circuit, whereby when the desired speed is reached, the vehicle can be accurately brought to the constant speed driving conditions at the vehicle speed existing at that moment without a deviation of several Km/h as was the case with conventional systems.

According to the present invention, the vehicle comes to the constant speed driving condition at the desired speed. Thus, when any of the setting switch, acceleration switch and deceleration switch is operated, the memory circuit stores the vehicle speed in the form of pulse signals which correspond in number to the desired speed and the throttle valve position in terms of pulse signals which are proportional to the throttle valve position derived from the desired speed instead of the pulse signals generated by the throttle position detector. Therefore, there is a remarkable feature in that the system can be set accurately to the desired speed without giving rise to an inconvenience that the vehicle set speed deviates 2 to 4 Km/h from the desired speed, if the system is set to the desired speed when the vehicle speed and the throttle valve position are not exactly corresponding to each other.

DESCRIPTION OF THE PREFERRED EMBODIMENT

Figure 1:
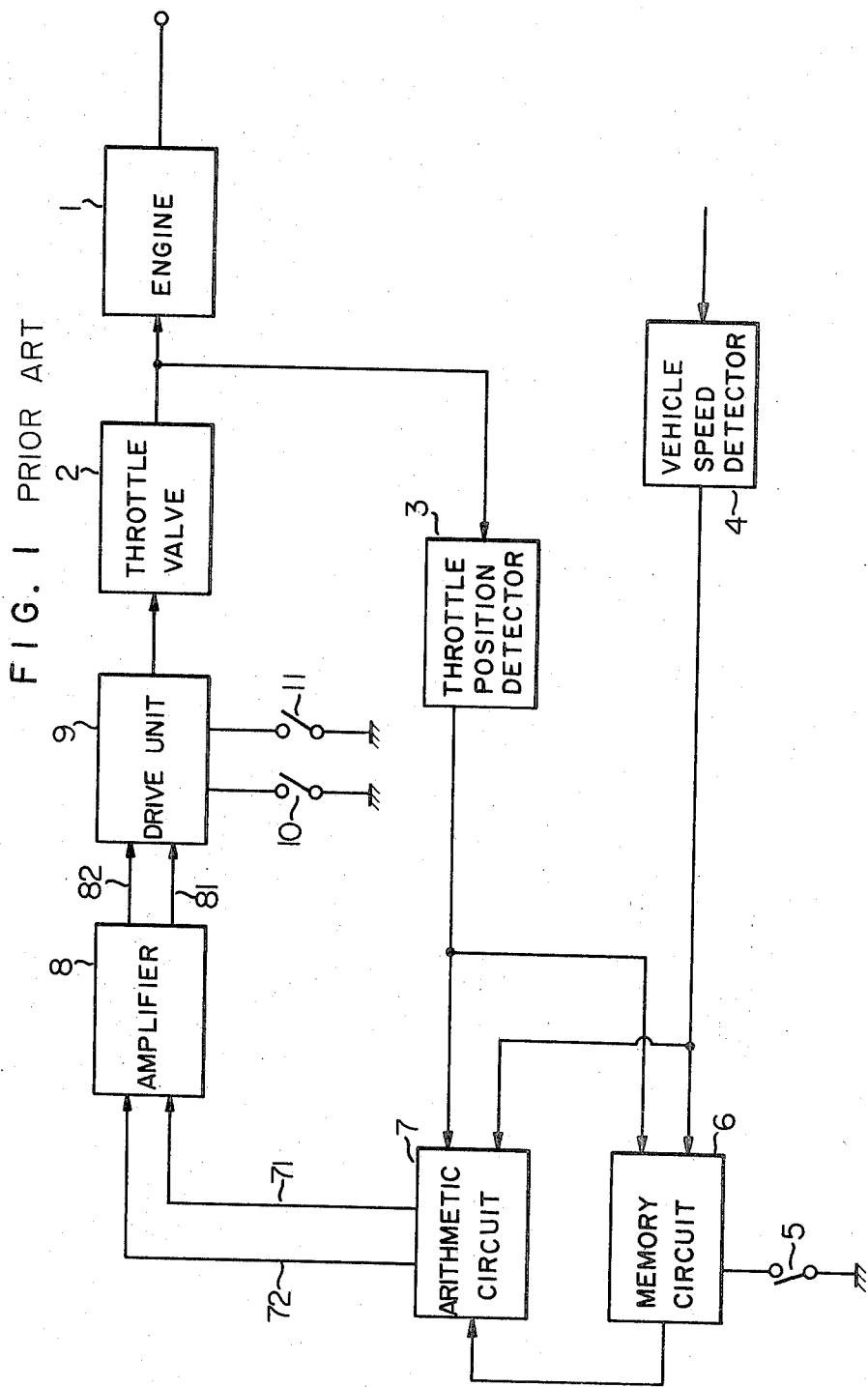
FIG. 1 is a block diagram of a conventional automatic constant speed control system for vehicles.
Figure 2:
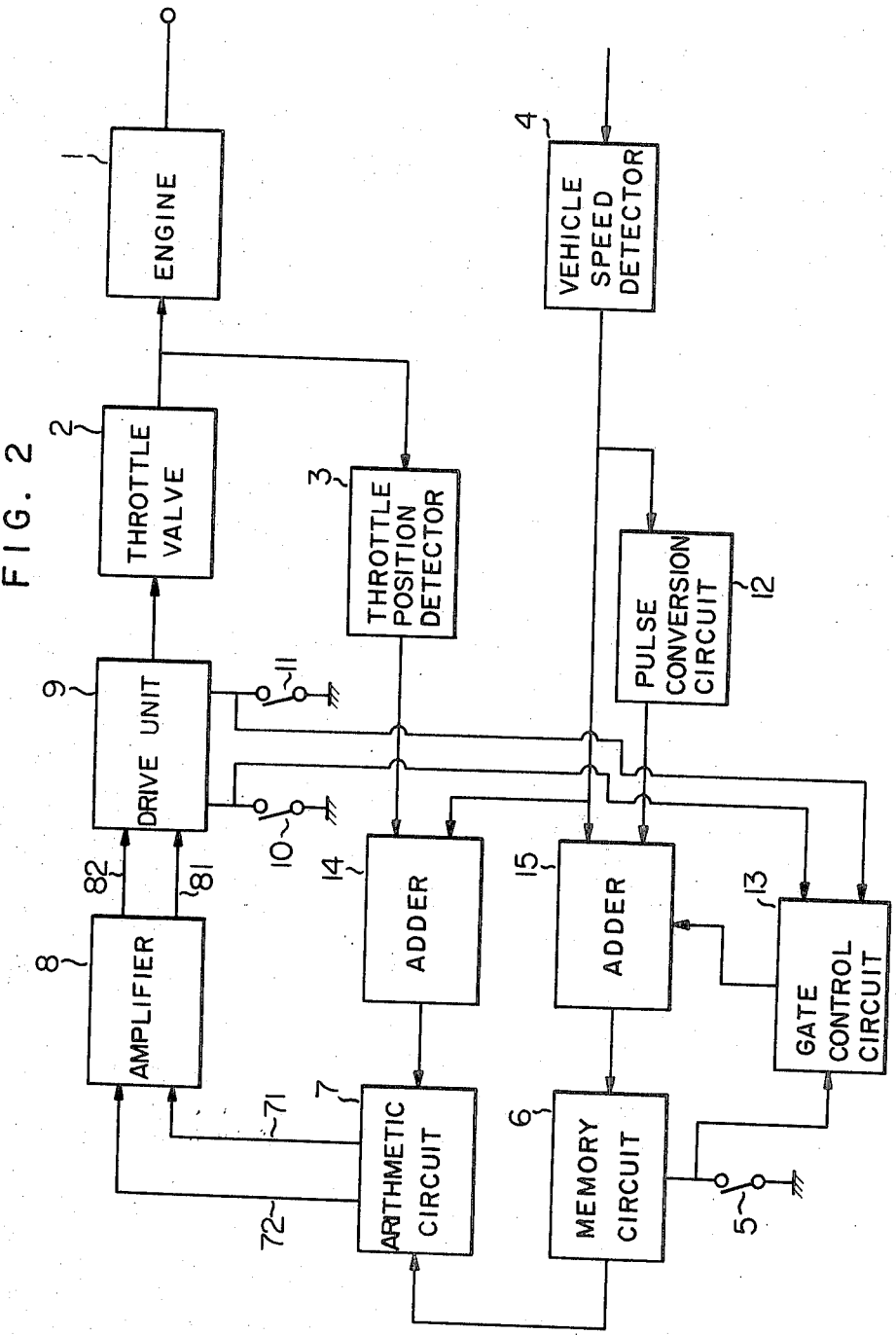
FIG. 2 is a block diagram of an embodiment of an automatic constant speed control system for vehicles according to the present invention.

A preferred embodiment of the present invention will now be explained with reference to the accompanying drawings. Referring first to FIG. 2, the general construction and operation of the preferred embodiment will be explained. In the figure, an amplifier 8 and a drive unit 9 are identical or equivalent to those shown in FIG. 1, and an acceleration switch 10 and a deceleration switch 11 are designed such that the instant the switch 10 or 11 is closed, the information stored in a memory circuit 6 is cleared and the speed of an engine 1 is either increased or decreased during the time that the switch 10 or 11 remains closed, and the vehicle comes to the constant speed driving condition when the switch 10 or 11 is released from its closed position. Numeral 12 designates a pulse conversion circuit which receives the output signal of a vehicle speed detector 4 and generates pulse signals corresponding in number to the position of the throttle valve 2 which is derived from the actual vehicle speed. Numerals 14 and 15 designate adders. The adder 14 generates the sum of output pulses of the vehicle speed detector 4 and output pulses of the throttle position detector 3 which are generated from time to time while the vehicle is being driven and then apply this sum to one of the input terminals of a comparison circuit in an arithmetic circuit 7. The adder 15 generates the sum of output pulses of the vehicle speed detector 4 and output pulses of the pulse conversion circuit 12 only when a vehicle set speed for constant speed driving condition is selected. This sum is stored in the memory circuit 6 which applies its stored value to the other input terminal of the comparison circuit in the arithmetic circuit 7. Numeral 13 designates a gate control circuit for causing the adder 15 to perform the operation of addition just for once when any of the setting switch 5, acceleration switch 10 and deceleration switch 11 is operated.

Figure 3:
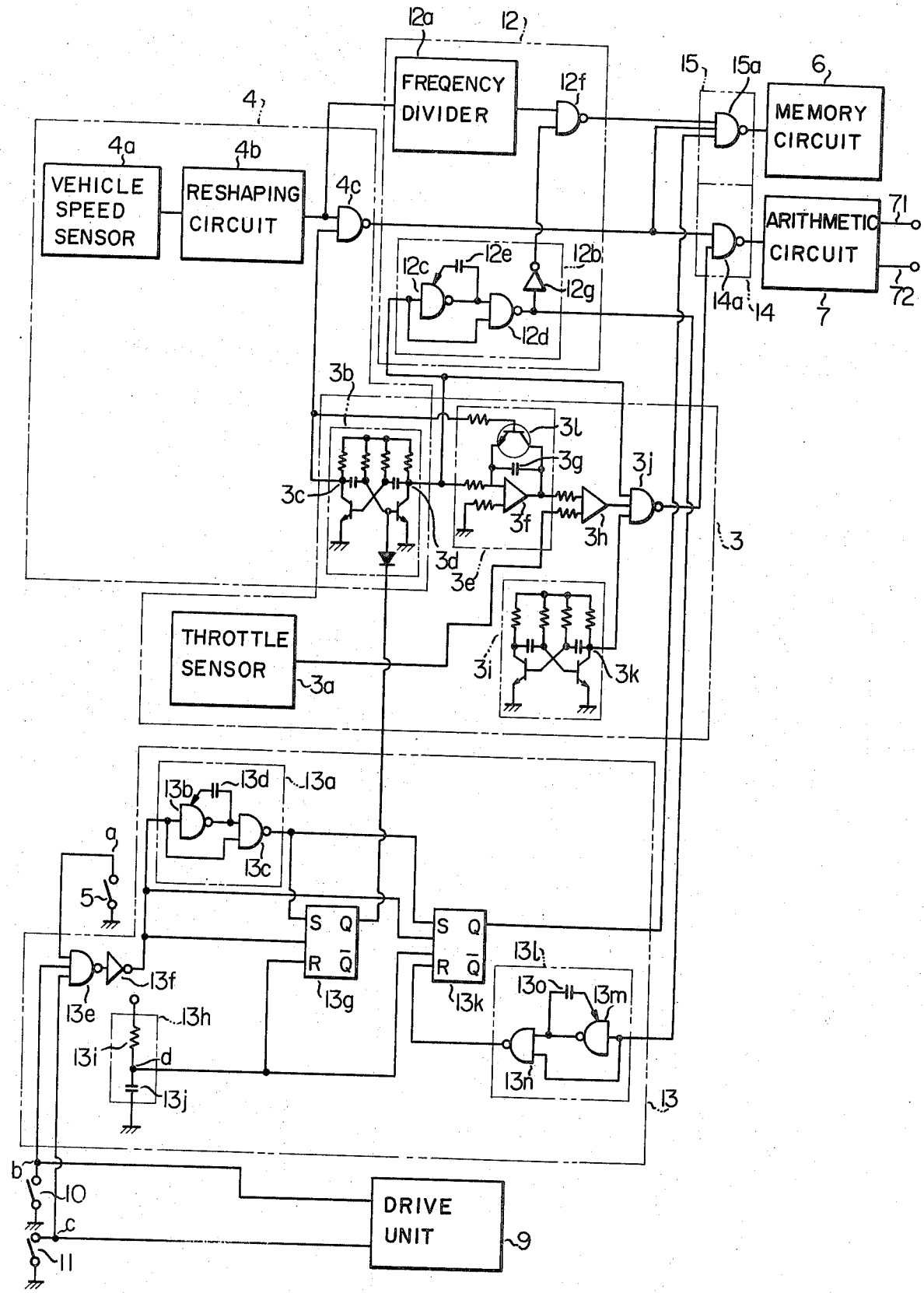
FIG. 3 is an electrical wiring diagram showing an embodiment of an electrical circuit of the principal part of the system according to the present invention.

The electric circuit of the principal part of the system of the present invention will now be explained with reference to FIG. 3. In the figure, each of the setting switch 5, acceleration switch 10 and deceleration switch 11 consists of an automatic reset type push button switch and the signal shown in FIG. 4(C) appears at their respective non-grounded end points $a$, $b$ and $c$. The vehicle speed detector 4 includes a vehicle speed sensor 4a which detects the actual vehicle speed in the form of a digital signal. The sensor 4a comprises for example a pickup device consisting of a toothed wheel of a magnetic material mounted on the propeller shaft and a permanent magnet having a coil wound therearound and mounted on the periphery of the toothed wheel with a certain gap provided therebetween, so that when the propeller shaft rotates, the magnetic flux linking the pickup coil is changed by the toothed wheel thereby producing in the coil the AC signal shown in FIG. 5(A) and having a frequency proportional to the vehicle speed. Numeral 4b designates a reshaping circuit for converting the AC signal from the vehicle speed sensor 4a into the rectangular pulses shown in FIG. 4(B) by utilizing for example the switching action of a transistor. Numeral 4c designates a NAND gate.

The throttle position detector 3 includes a throttle sensor 3a for detecting a DC voltage corresponding to the position of the throttle valve 2 in the vehicle engine 1 and the throttle sensor 3a comprises for example a potentiometer operatively linked to the shaft of the throttle valve 2. Numeral 3b designates a reference pulse generating astable multivibrator which generates the reference pulse signal shown in FIG. 4(D) at its output terminal 3c and the reference pulse signal shown in FIG. 4(E) at the other output terminal 3d. Numeral 3e designates an integrator circuit comprising an amplifier 3f, a feedback capacitor 3g and a discharging circuit transistor 3*l*, so that the reference pulse signal of FIG. 4(E) generated at the output terminal 3*d* of the astable multivibrator 3*b* is integrated and at the instant this pulse signal changes from the high level to the low level after the lapse of a time $T_1$, the transistor 3*l* is conducted instantaneously discharging the charge on the capacitor 3*g* and thus generating the sawtooth wave pulses shown in FIG. 4(F). Numeral 3*h* designates a comparison circuit which compares the sawtooth pulse signals from the integrator circuit 3*e* and the DC voltage V from the throttle sensor 3*a* as shown in FIG. 4(F) for example, and generates the pulse signals shown in FIG. 4(G) and having a pulse width corresponding to the position of the throttle valve 2. Numeral 3*i* designates an astable multivibrator for generating the pulse signals shown in FIG. 4(H). Numeral 3*j* designates a NAND gate for performing the NAND operation on the output signal generated at the output terminal 3*d* of the astable multivibrator 3*b*, the output signal of the comparison circuit 3*h* and the output signal generated at an output terminal 3K of the astable multivibrator 3*i*, thereby generating the pulse signals shown in FIG. 4(I) which are equal to the count of output pulses of the astable multivibrator which are passed during the period $T_1$ of the reference pulse signal shown in FIG. 4(E) excluding the output pulse width of the comparison circuit 3*h*, the number of the output pulses passed being proportional to the position of the throttle valve 2.

The NAND gate 4*c* in the vehicle speed detector 4 performs the NAND operation on the output pulse signal of the reshaping circuit 4*b* and the output pulse signal generated at the output terminal 3*c* of the astable multivibrator 3*b*, thereby generating the pulse signals shown in FIG. 4(J) equal to the count of the output pulse from the reshaping circuit 4*b* which are passed during the period $T_2$ of the reference pulse signal shown in FIG. 4(D), the number of the output pulses passed being proportional to the actual vehicle speed.

In the pulse conversion circuit 12, numeral 12*a* designates a frequency dividing circuit comprising binary counters or JK flip-flops connected in cascade and adapted to receive as its input the output signal of the reshaping circuit 4*b* in the vehicle speed detector 4*b* for generating the pulse signals shown in FIG. 4(M). Numeral 12*b* designates a delay circuit comprising an inverter 12*c* consisting of a NAND gate, a NAND gate 12*d* and a capacitor 12*e* and adapted to receive as its input the reference pulse signal (shown in FIG. 4(E)) generated at the output terminal 3*d* of the astable multivibrator 3*b* for generating the pulse signals ("O" signals) shown in FIG. 4(K) which are synchronized with the rise of the reference pulse signal. Numeral 12*f* designates a NAND gate for performing the NAND operation on the output signal of the frequency dividing circuit 12*a* and the output signal of the delay circuit 12*b* which was inverted by the inverter 12*g* to generate the pulse signals shown in FIG. 4(N).

In the gate control circuit 13, numeral 13*a* designates a delay circuit comprising an inverter 13*b* consisting of a NAND gate, a NAND gate 13*c* and a capacitor 13*d* and adapted to receive as its input the signal generated at the non-grounded end *a*, *b* or *c* of the switch 5, 10 or 11 and, after passing through a NAND gate 13*e*, inverted by an inverter 13*f* for generating the pulse signal ("O" signal) synchronized with the rise of the input signal and having a short pulse width. Numeral 13*g* designates a set-reset flip-flop (hereinafter simply referred to as an RSFF) having its set terminal S connected to the output terminal of the delay circuit 13*a* and its reset terminal R is connected to the output terminal of the inverter 13*f*. Numeral 13*h* designates a zero signal generating circuit for generating a signal when the power is turned on, the circuit comprising a resistor 13*i* and a capacitor 13*j* and adapted to effect the initial resetting of the RSFF 13*g* and a RSFF 13*k* by utilizing the charging time of the capacitor 13*j*. The output terminal of the delay circuit 13*a* is connected to the set terminal S of the RSFF 13*k*. Numeral 13*l* designates a delay circuit comprising an inverter 13*m* consisting of a NAND gate, a NAND gate 13*n* and a capacitor 13*o* and adapted to receive as its input the output pulse signal of the delay circuit 12*b* in the pulse conversion circuit 12 for generating the pulse signals ("O" signals) synchronized with the rise of the input pulse signal and having a short pulse width. This pulse signal is shown in FIG. 4(L) and applied to the reset terminal of the RSFF 13*k*. The adder 15 comprises a NAND gate 15*a* adapted to perform the NAND operation on the output signal of the NAND gate 12*f* in the pulse conversion circuit 12, the output signal of the NAND gate 4C in the vehicle speed detector 4 and the output signal generated at the output terminal Q of the RSFF 13*k* for generating the pulse signals shown in FIG. 4(O). The adder 14 comprises a NAND gate 14*a* adapted to perform the NAND operation on the output signal of the NAND gate 4*c* and the output signal of the NAND gate 3*j* in the throttle position detector 3 for generating the pulse signals shown in FIG. 4(P). The output signal of the NAND gate 15*a* of the adder 15 constitutes the input signal to the memory circuit 6, and the output signal of the NAND gate 14*a* of the adder 14 is applied to one of the input terminals of the comparison circuit in the arithmatic circuit 7.

With the construction described above, the operation of the system according to the present invention will now be explained. In the discussion to follow, the logical operations will be explained in terms of positive logic. Assuming now that the circuits are connected to the power supply, that is, a key switch is closed, for example, a "O" signal is temporarily generated at the terminal *d* of the zero signal generating circuit 13*h* in the gate control circuit 13 and this "O" signal is then applied to the reset terminal R of the RSFF 13*g* and RSFF 13*k*, respectively, causing the both RSFF's to store a "O" signal at the output terminal Q thereof.

Figure 4:
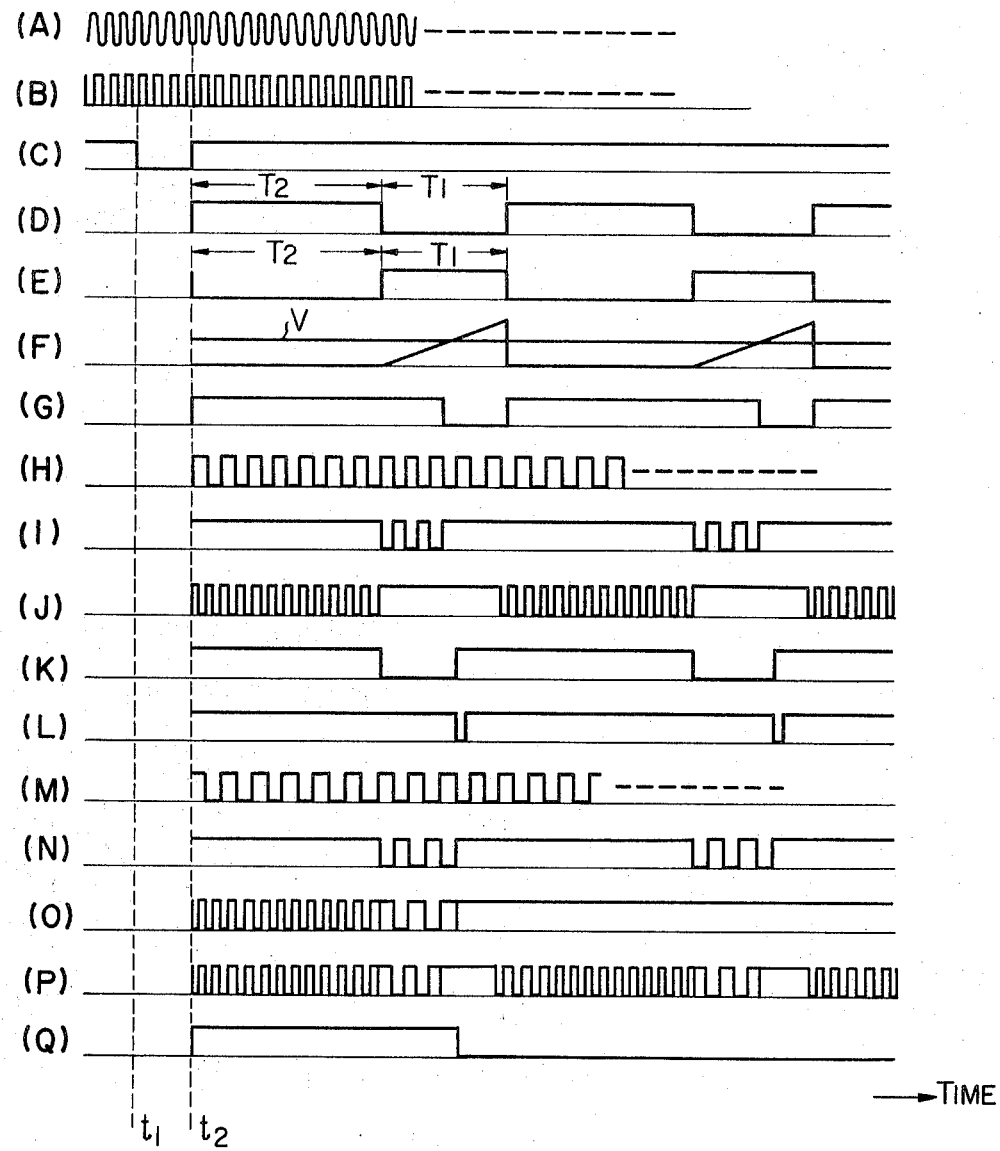
FIG. 4 is a diagram showing the voltage waveforms at various portions of the electric circuit useful for explaining the operation of the system of the invention.

With the vehicle being driven at a suitable speed, if, at the time $t_1$ in FIG. 4, the setting switch 5 is closed to bring the vehicle to a constant speed driving condition at the existing vehicle speed or alternately either the acceleration switch 10 or deceleration switch 11 is closed to cause the vehicle to break away from the current constant speed driving condition and come to a new constant speed driving condition at a different speed, the "O" signal shown in FIG. 4(C) appears at the output terminal of the inverter 13*f* and this "O" signal is applied to the reset terminal R of the RSFF 13*g* and the RSFF 13*k*, respectively, causing the RSFF's 13*g* and 13*k* to store a "O" signal at their output terminals Q as previously explained. Then, at time $t_2$, as the driver takes his finger from the switch being depressed, the switch returns to its open position by its self-position by its self-restoring force and the resultant "1"

signal at the output terminal of the inverter 13f is applied to the delay circuit 13a. When this occurs, a "O" signal is generated at the output terminal of the delay circuit 13a and this "O" signal is then applied to the set terminal S of the RSFF 13g and the RSFF 13k, respectively, thereby changing the signal at the respective output terminal Q thereof from "O" to "1." This "1" signal causes the astable multivibrator 3b in the throttle position detector 3 to start oscillating, thereby generating the reference pulse signals shown in FIG. 4(D) at the output terminal 3c. On the other hand, the AC signal proportional to the actual vehicle speed and generated by the vehicle speed sensor 4a in the vehicle speed detector 4 is reshaped by the reshaping circuit 4b and the resultant rectangular pulse signals shown in FIG. 4(B) are applied to one of the input terminals of the NAND gate 4C, and the pulse signals generated at the output terminal 3c of the astable multivibrator 3b as shown in FIG. 4(D) are applied to the other input terminal of the NAND gate 4C, so that the NAND gate 4C performs the NAND operation on both input signals generating the output pulse signals shown in FIG. 4(J). The number of pulses in the output pulse signal generated at the output terminal of the NAND gate 4C is proportional to the actual vehicle speed at that time. While on the other hand, the "1" signal portion of the rectangular pulse signals shown in FIG. 4(E) and generated at the output terminal 3d of the astable multivibrator 3b is integrated by the integrator circuit 3e generating an integrated output having the waveform shown in FIG. 4(F). This integrated output is applied to one of the input terminals of the comparison circuit 3h and the DC voltage V generated by the throttle sensor 3a and proportional to the position of the throttle valve 2 is applied to the other input terminal of the comparison circuit 3h, so that the comparison circuit 3h compares the two input signals and produces the pulse signal shown in FIG. 4(G) which becomes the "O" signal when the former is greater than the latter. The pulse width of this pulse signal corresponds to the position of the throttle valve 2. The output pulse signal of the comparison circuit 3h, the output pulse signal generated at the output terminal 3d of the astable multivibrator 3b and the output pulse signal generated at the output terminal 3k of the astable multivibrator 3i is shown in FIG. 4(H) are applied to the input terminals of the NAND gate 3j, so that the NAND operation is performed on the three input signals thus producing the pulse signals shown in FIG. 4(I) at the output terminal of the NAND gate 3j. The number of the pulse signals produced at the output terminal of the NAND gate 3j is proportional to the position of the throttle valve 2 existing at the moment under consideration. On the other hand, during the time width $T_2$ of the reference pulse signal shown in FIG. 4(D), the NAND gate 4C generates at its output terminal pulse signals proportional in number to the actual vehicle speed existing at that time, while during the time width $T_1$ of the same reference pulse signal excluding the output pulse width of the comparison circuit 3h, the NAND gate 3j produces at its output terminal pulse signals proportional in number to the position of the throttle valve 2 existing at that time. The output pulse signals of the two NAND gages 4C and 3j are then applied to the two input terminals of the NAND gate 14a of the adder 14, so that the NAND gate 14a performs the NAND operation on the two inputs thereby generating, as shown in FIG. 4(P), the pulse signals representing the sum of the pulse signals proportional in number to the actual vehicle speed and those proportional in number to the position of the throttle valve 2 existing at the same point in time. On the other hand, the delay circuit 12b in the pulse conversion circuit 12 receives as its input the output signal generated at the output terminal 3d of the astable multivibrator 3b and produces the pulse signals (the "O" signals) of FIG. 4(K) synchronized with the rise of the input signal. The frequency dividing circuit 12a also divides the frequency of the output signal of the reshaping circuit 4b to produce the pulse signals shown in FIG. 4(M), and the NAND gate 12f performs the NAND operation on the output signal of the frequency dividing circuit 12a and the output signal of the delay circuit 12b which was inverted by the inverter 12g, thereby producing the pulse signals shown in FIG. 4(N). The number of the pulse signals generated at the output terminal of the NAND gate 12f corresponds to the position of the throttle valve 2 derived from the actual vehicle speed existing at that time. The delay circuit 13l receives as its input the output signal of the delay circuit 12b and produces the "O" signal shown in FIG. 4(L) which is synchronized with the rise of the input signal and whose pulse width is short. This "O" signal is applied to the reset terminal R of the RSFF 13k, causing the signal at the output terminal Q to change from its previously stored "1" state to the "O" as shown in FIG. 4(Q). The NAND gate 15a of the adder 15 performs the NAND operation on the output signal of the NAND gate 12f, the output signal of the NAND gate 3j and the output signal shown in FIG. 4(Q) and generated at the output terminal Q of the RSFF 13k, thereby producing the pulse signals shown in FIG. 4(O). The number of the pulse signals generated at the output terminal of the NAND gate 15a represents the sum of the pulse signals corresponding in number to the desired vehicle speed and the pulse signals corresponding to the position of the throttle valve 2 derived from the desired vehicle speed, which pulse signals have been generated when any one of the setting switch 5, acceleration switch 10 and deceleration switch 11 is operated to bring the vehicle to the constant speed driving condition at the desired speed. The output pulse signal of the NAND gate 15a is stored in the memory circuit 6 as a binary number. The arithmetic circuit 7 compares the binary number stored in the memory circuit 6 with the output pulse signal of the adder 14 in the binary number system to determine their relative size one to another. When the result of the comparison indicates that the vehicle speed should be increased, the signal for increasing the opening of the throttle valve 2 is generated at the output terminal 71, whereas if the indication is to decrease the vehicle speed, the signal for reducing the opening of the throttle valve 2 is generated at the output terminal 72, thereby actuating the amplifier 8 and the drive unit 9 to maintain the vehicle at the constant speed.

I claim:
1. An automatic constant speed control system for vehicles, in which a vehicle speed and position of a throttle valve are detected, comprising:
   a vehicle speed detector (4) for producing pulse signals corresponding to the vehicle speed,
   a throttle position detector (3) for producing actual pulse signals corresponding to the position of a throttle valve in an engine installed in the vehicle, a reference pulse generating means (3b) for generating reference pulses, a gate control circuit (13) for causing a first adder to perform the operation of addition just once when a setting switch is operated and causing said reference pulse generating means to operate, a logic circuit (4c) for forming the logical product of the output from said vehicle speed detector and the output from said reference pulse generating means, a pulse conversion circuit (12) for producing desired pulse signals corresponding in number to the position of the throttle valve which is derived from the actual vehicle speed, a first adder (15a) for forming the logical product of the output from said pulse conversion circuit, the output from said logic circuit and the output from said gate control circuit, a second adder (14a) for forming the logical product of the output from said logic circuit and the output from said throttle position detector, a memory circuit (6) for storing the output from said first adder which are the sum of said pulse signals being proportional in number to the vehicle speed and said desired pulse signals corresponding in number to the throttle position derived from the actual vehicle speed, an arithmetic circuit (7) for receiving the output from said second adder which are the sum of said pulse signals being proportional in number to the vehicle speed and said actual pulse signals corresponding in number to the position of the throttle valve, and for comparing said output from said second adder with said output from said first adder, a drive unit for receiving an output from said arithmetic circuit and for actuating said throttle valve.

\* \* \* \* \*